March 16, 1926.
L. E. BISCH
1,577,164
AUTOMOBILE SIDE CURTAIN
Filed Oct. 22, 1923
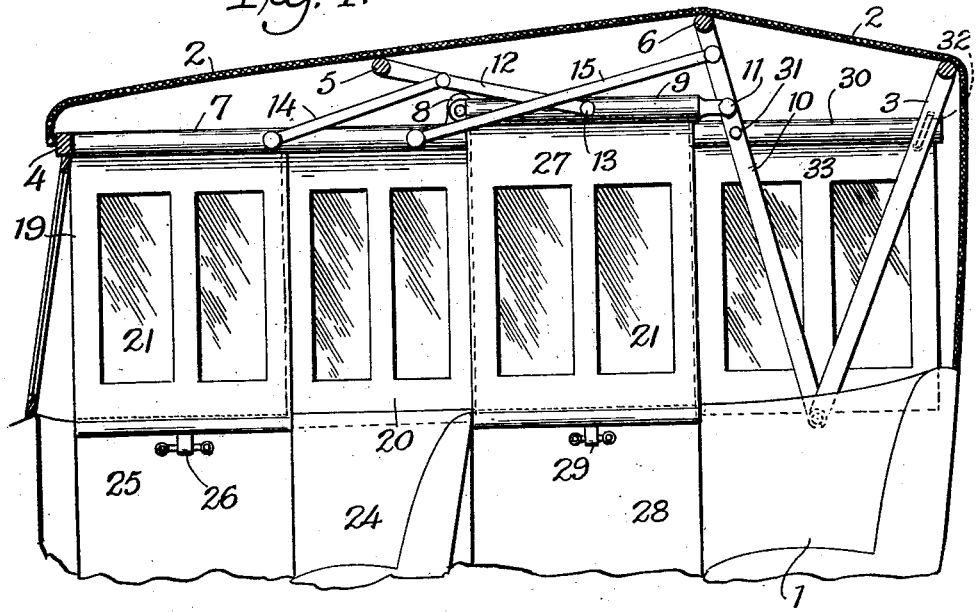
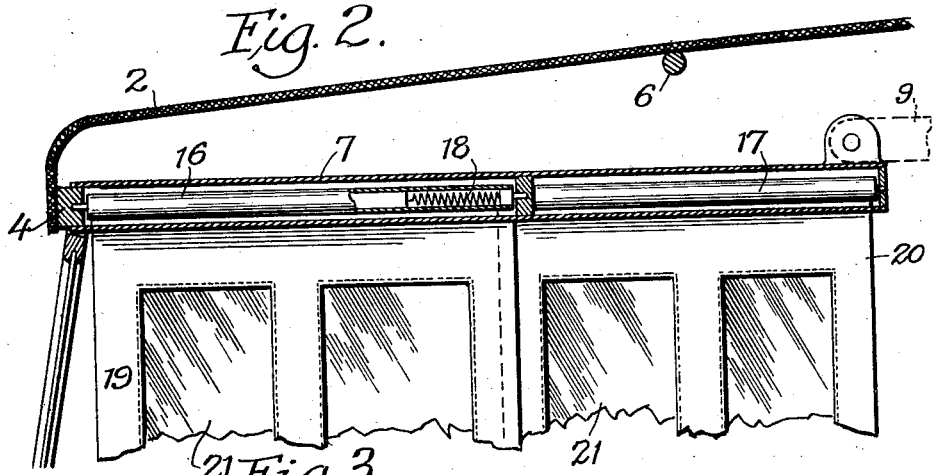
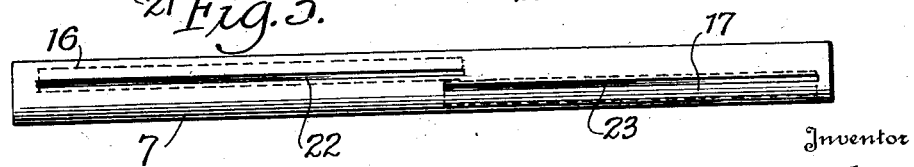
Inventor
Louis E. Bisch.
By J. W. Hazell
Attorney Patented Mar. 16, 1926.

1,577,164

UNITED STATES PATENT OFFICE.

LOUIS E. BISCH, OF ASHEVILLE, NORTH CAROLINA.

AUTOMOBILE SIDE CURTAIN.

Application filed October 22, 1923. Serial No. 670,092.

*To all whom it may concern:*

Be it known that I, LOUIS E. BISCH, a citizen of the United States, residing at Asheville, in the county of Buncombe and State of North Carolina, have invented certain new and useful Improvements in Automobile Side Curtains, of which the following is a specification.

The present invention relates to automobiles, and more particularly to side curtains therefor.

An object of the invention is to provide side or storm curtains for automobiles which can be easily and quickly placed in position without loss of time whenever necessary.

Another object of the invention is to provide side curtains which can be quickly and automatically stowed away when not in use.

A further object of the invention is to provide side curtains in combination with an automobile top of the collapsible type, in the frame work of which the side curtains are automatically housed when not in use, the curtains being simply drawn down and temporarily attached to the body of the automobile whenever desired.

Still further objects and advantages of the invention will be apparent from the following detailed description taken in connection with the accompanying drawings which illustrate one preferred embodiment of the invention, and in which Figure 1 is a longitudinal side elevation partly in section of an automobile having a collapsible canopy top constructed in accordance with the present invention.

Fig. 2 is an enlarged fragmentary elevation partly in section showing more in detail the construction of one of the side rails forming part of the collapsible canopy top support, and Fig. 3 is a bottom view of the side rail shown in Fig. 2 and illustrating the overlapping slots provided therein.

Referring in detail to the drawings, the automobile body 1 is provided with the collapsible top 2 which may be of the usual or standard canopy type. The top 2 is supported in extended position by the rear and front bows 3 and 4, respectively, and also by the intermediate bows 5 and 6. Extending rearwardly from the front bow 4 on each side is the rail 7 having at its rear end an upstanding portion 8 to which is pivoted the link 9 whose other end is pivotally connected to the vertical portion 10 of the intermediate bow 6, as indicated at 11. The lateral portion 12 of the intermediate bow 5 is pivotally connected to the link 9 at 13. Links 14 ad 15 connect the intermediate bows 5 and 6, respectively, with the side rail 7, the links being pivoted at each of their ends to the parts to which they are attached. The specific type of collapsible frame herein illustrated is shown by way of example merely, as the present invention is not limited to the particular type shown, but may be used as well in combination with any other usual, standard, or desirable form of frame.

The side rail 7 is, in accordance with the present invention, made hollow and of a sufficient size to accommodate within it rollers 16 and 17 which are preferably not aligned but are arranged in offset relation to each other. The rollers 16 and 17 are rotatably mounted within the side rail 7 and each roller is provided with a spring 18. Affixed to each of the rollers 16 and 17 are side curtains 19 and 20, respectively, having therein the transparent and flexible lights 21 of celluloid or other suitable material.

The side rail 7 is provided on its lower side with the offset slots 22 and 23 which are located, respectively, under the rollers 16 and 17, and through which the curtains are adapted to be drawn from their rolled position on the spring rollers 16 and 17 within the side rail 7, when it is desired to place the side curtains in position. By arranging the rollers 16 and 17 and the slots 22 and 23 in offset and overlapping relation one curtain will overlap the other sufficiently to provide a continuous and uninterrupted side covering.

The curtain 20 is illustrated as being attached to the panel 24 on the outside thereof and the curtain 19 is illustrated as being drawn down and attached to the front door 25 by any convenient form of attaching means 26, but it is to be understood that any or all of the curtains may be attached either on the inside or on the outside, as may be found convenient or desirable, the arrangement being such as to provide for the raising and lowering, especially of the door curtains from the interior of the automobile.

The link 9 is also made hollow and of sufficient size to accommodate within it a spring roller having attached thereto the curtain 27 adapted to be drawn down and attached to the rear door 28 by any convenient attaching means 29. The link 9 being laterally offset from the side rail 7 is thus adapted to house a spring roller having thereon a curtain adapted to overlap the adjacent curtain 20 and thus provide a continuous and uninterrupted side protection.

In the form of collapsible top supporting frame illustrated in Fig. 1, there may be provided the bracing link 30 which may be pivoted at 31 to the side 10 of the intermediate bow 6, by means of which it may be rotated about the pivot 31 to overlie the side 10 in close proximity thereto, in which position it does not interfere with the folding up of the collapsible frame. When the top is up, however, the bracing link 30 may be rotated about its pivot 31 to the horizontal position shown in Fig. 1, where it may be temporarily attached to the side portion of the rear bow 3, by any convenient attaching means 32, such as a strap or other desired fastener. The bracing link 30 is made hollow and of sufficient size to accommodate within it a spring roller having attached thereto the side curtain 33, the bracing link 30 being provided on its under side with a slot through which the curtain 33 may be drawn down when desired and attached to the side of the automobile body. When the bracing link 30 is in its horizontal position, it is sufficiently high to be within the canopy top, and is only turned about its pivot 31 to overlie the side 10 of the intermediate bow when the canopy top is to be folded back, in which position the bracing link 30 will not be visible.

As not only the bracing link 30 but also the side rail 7 and the link 9 are located within the canopy top, that is, higher than the lower side edge of said top, these parts will be visible only from the interior of the automobile, and will be unnoticeable, being merely of slightly larger size than might be necessary without the present invention.

By the foregoing construction there has been provided a set of side or storm curtains for automobiles which can be easily and quickly placed in position without loss of time or other inconvenience; a set of side or storm curtains which are automatically rolled up and stowed away when not in use, and without the necessity of providing any additional mounting, hanging, or housing means in the automobile top other than the collapsible frame which is necessary to support the top; and a set of side curtain rolling and housing means which does not interfere with the folding up of the collapsible top supporting frame, being located within the frame itself.

What is claimed is:

1. In a collapsible top comprising supporting bows and rigid side rails, a plurality of overlapping rollers mounted in each of said side rails, a roller housing pivoted at one end to one of the side rails and at its other end to one of the bows, a roller in said roller housing arranged so that it overlaps the adjacent roller in the side rail, and side curtains on each of said overlapping rollers.

2. In a collapsible top including supporting bows, a rigid side rail constituting a housing for a plurality of overlapping rollers, a roller housing pivoted to said side rail and to one or more bows, a second roller housing pivoted to one bow and detachably associated with a second bow, said side rail and roller housings forming part of the top supporting frame, overlapping rollers in said roller housings, the roller in the first mentioned roller housing overlapping the adjacent roller in the side rail, and side curtains on each of said overlapping rollers.

3. In a collapsible top including supporting bows, a rigid side rail constituting a housing for a plurality of overlapping rollers, a roller housing pivoted at one end to said side rail and at its other end to a bow, said side rail and roller housing forming part of the top supporting frame, a roller in said roller housing overlapping the adjacent roller in the side rail, and side curtains on each of said overlapping rollers.

In testimony whereof I affix my signature.

LOUIS E. BISCH.